United States Patent [19]

Hamada

[11] Patent Number: 5,732,132
[45] Date of Patent: Mar. 24, 1998

[54] TELEPHONE UPDATING VIA NETWORK PROVIDED INFORMATION

[75] Inventor: Noboru Hamada, Yokohama, Japan

[73] Assignee: Canon Kabushiki Kaisha, Tokyo, Japan

[21] Appl. No.: 449,085

[22] Filed: May 24, 1995

Related U.S. Application Data

[63] Continuation of Ser. No. 59,637, May 10, 1993, abandoned.

[30] Foreign Application Priority Data

May 11, 1992 [JP] Japan .................................. 4-144904

[51] Int. Cl.⁶ ......................................................... H04M 1/56
[52] U.S. Cl. ...................... 379/354; 379/93.23; 379/213; 379/355
[58] Field of Search ............................... 379/92, 142, 201, 379/210, 211, 212, 213, 354, 355, 356, 357, 396, 93.17, 93.23; 370/110.1

[56] References Cited

U.S. PATENT DOCUMENTS

| | | | |
|---|---|---|---|
| 4,313,035 | 1/1982 | Jordan et al. | 379/207 |
| 4,450,320 | 5/1984 | Ostermann et al. | 379/357 |
| 4,740,788 | 4/1988 | Konneker | 379/211 |
| 4,791,666 | 12/1988 | Cobb et al. | 379/84 |
| 4,860,342 | 8/1989 | Danner | 379/354 |
| 4,894,861 | 1/1990 | Fujioka | 379/374 |
| 5,054,051 | 10/1991 | Hoff | 379/355 |
| 5,101,427 | 3/1992 | Kotani et al. | 379/355 |
| 5,182,769 | 1/1993 | Yamaguchi et al. | 379/355 |
| 5,212,721 | 5/1993 | DeLuca et al. | 379/355 |
| 5,241,589 | 8/1993 | Jefferson | 379/355 |
| 5,259,026 | 11/1993 | Johnson | 379/213 |

FOREIGN PATENT DOCUMENTS

| | | | |
|---|---|---|---|
| 0057044 | 2/1990 | Japan | 379/77 |
| 0090771 | 3/1990 | Japan | 379/142 |

OTHER PUBLICATIONS

"Gaston Telephone Answering System and Solid–State Announcement Machine", R. Tanguy et al., Commutation & Transmission, No. 2, pp. 67–80, Jun. 1983.
"ISDN: Concepts, Facilities, and Services", Gory C. Kessler, Copyright 1990 McGraw–Hill Inc. pp. 224–226.

*Primary Examiner*—Krista Zele
*Assistant Examiner*—Scott L. Weaver
*Attorney, Agent, or Firm*—Morgan & Finnegan LLP

[57] ABSTRACT

A communication terminal apparatus is so adapted that when an outgoing call to the terminal of a desired party ends in failure, it is determined whether the cause of the failure is a change in the terminal number of the party's terminal. This determination is made based upon cause-indicating information contained in a message received via a communication line. In a case where it is found that the cause of the failure is a change in the party's terminal number, the new terminal number is acquired from the received message. A recall operation is then performed to place the outgoing call again, this time to the new terminal number that has been acquired.

28 Claims, 7 Drawing Sheets

| ABBREVIATED NUMBER | PARTY'S TERMINAL NUMBER |
|---|---|
| 01 | 123456789 |
| 02 | 234567890 |
| ⋮ | ⋮ |
| 10 | 987654321 |
| ⋮ | ⋮ |

70

| ABBREVIATED NUMBER | PARTY'S TERMINAL NUMBER |
|---|---|
| 01 | 123456789 |
| 02 | 234567890 |
| ⋮ | ⋮ |
| 10 | 876543210 |
| ⋮ | ⋮ |

71

UPDATE

TELEPHONE UPDATING VIA NETWORK PROVIDED INFORMATION

This is a continuation of application Ser. No. 08/059,637, filed on May 10, 1993, now abandoned.

BACKGROUND OF THE INVENTION

This invention relates to a communication terminal apparatus and, more particularly, to communication terminal apparatus in which a recall operation is facilitated when an outgoing call has failed.

In a conventional communication terminal apparatus, an outgoing call will fail if the telephone number of the party attempting to be called has changed for some reason, such as a change in the residence of the called party.

A problem encountered with the conventional communication terminal apparatus, therefore, is that when the number of the other party has changed, the user is required to enter the new number of the party in order to communicate with the party. Consequently, operability is poor.

Further, in a communication terminal apparatus having a telephone directory function in which the telephone number of a frequent party to communication is registered in advance and a call is placed to this party through a simple operation, it is necessary that the new telephone number of the party be registered in the telephone-number data base again. Operability is poor as a result.

SUMMARY OF THE INVENTION

An object of the present invention is to provide a communication terminal apparatus in which, when the telephone number of a party to communication has changed or missed, it is possible to update the old telephone number of this party, which has been registered in the terminal apparatus on the calling side, to the new telephone number.

According to the present invention, the foregoing object is attained by providing a communication terminal apparatus comprising a data base for storing terminal-number information of a plurality of parties to communication, calling means for placing an outgoing call in accordance with the terminal number information stored in said data base, determination means which, when the outgoing call has failed, is for determining whether the failure of the outgoing call has been caused by a change in the party's terminal number or missing number and updating means for updating the terminal number, which has been stored in said data base prior to the change, to the new terminal number in a case where said determination means has determined that the failure of the outgoing call has been caused by a change in the party's terminal number, or invalidating the terminal number, which has been stored in said data base in a case where said determination means has determined that the failure of the outgoing call has been caused by missing number.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

When an outgoing call is placed to the terminal of a desired party from an ISDN terminal on the calling side and the call ends in failure because the terminal number has changed for some reason, such as a change in the residence of the called party, the network exchange transfers a message (a call-disconnect message), which indicates the failure of the outgoing call, to the terminal on the calling side in accordance with Q.931 of the CCITT. The message contains a code indicating that the number of the called party's terminal has changed, as well as information giving the new number of the party's terminal. The present invention makes use of this information. Embodiments according to the present invention will now be described with reference to the accompanying drawings.

(First Embodiment)

Figure 1:
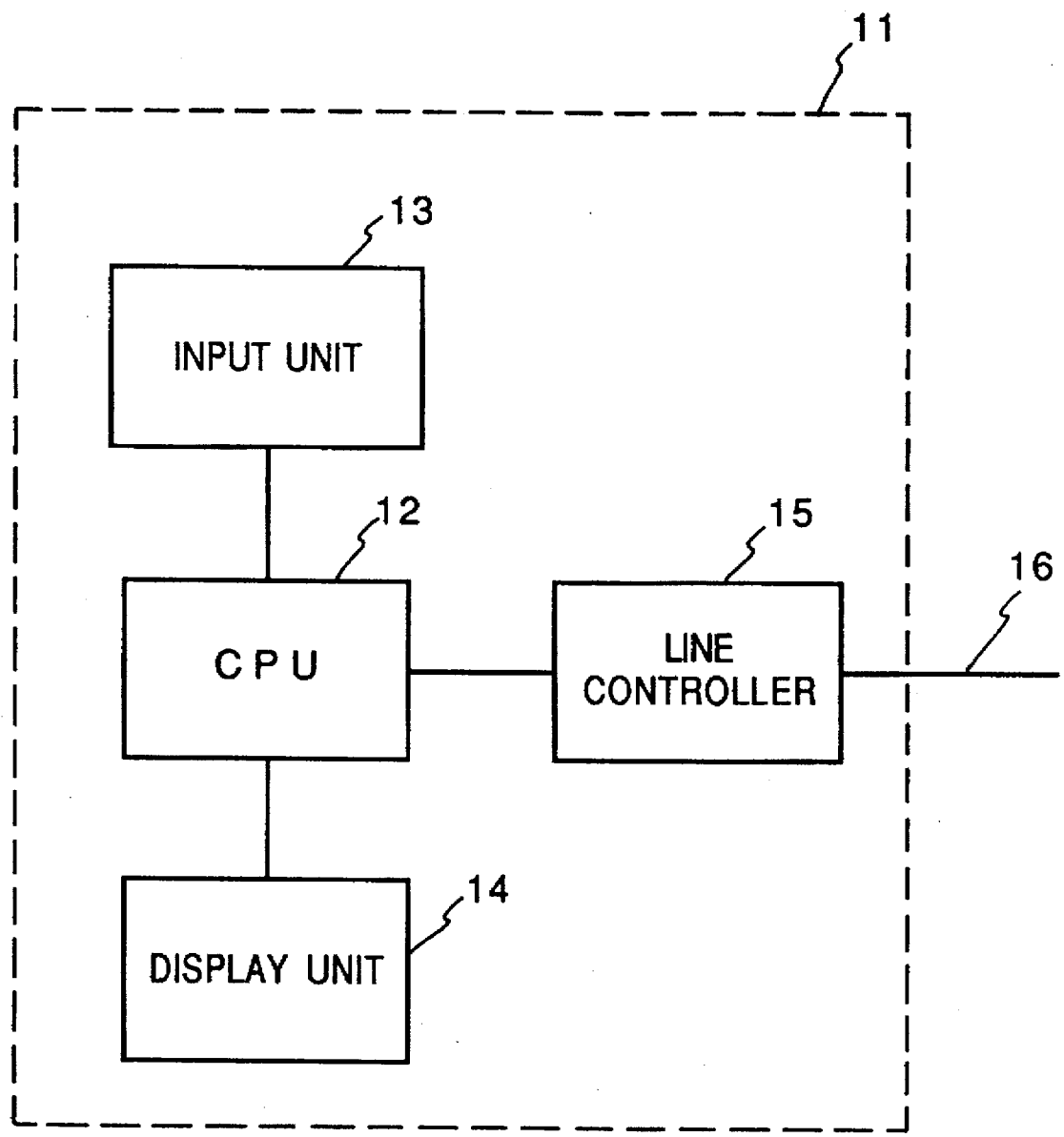
FIG. 1 is a block diagram illustrating the general configuration of a communication terminal apparatus embodying the present invention.

FIG. 1 is a block diagram illustrating the general configuration of a communication terminal apparatus according to a first embodiment of the present invention. This is an example in which the invention is applied to an ISDN.

As shown in FIG. 1, a communication terminal apparatus 11 includes a CPU 12 for controlling the overall apparatus, an input unit 13 for entering the terminal number (hereinafter referred to as the "number") of a party to communication, a display unit 14 for displaying information relating to communication, and a line controller 15 for controlling a communication line 16. The apparatus 1 is connected to a communication line 16 via the line controller 15.

The CPU 12 has a ROM (not shown) storing the CPU processing procedure (program) and a RAM used as the work area of the CPU 12.

Figure 2:
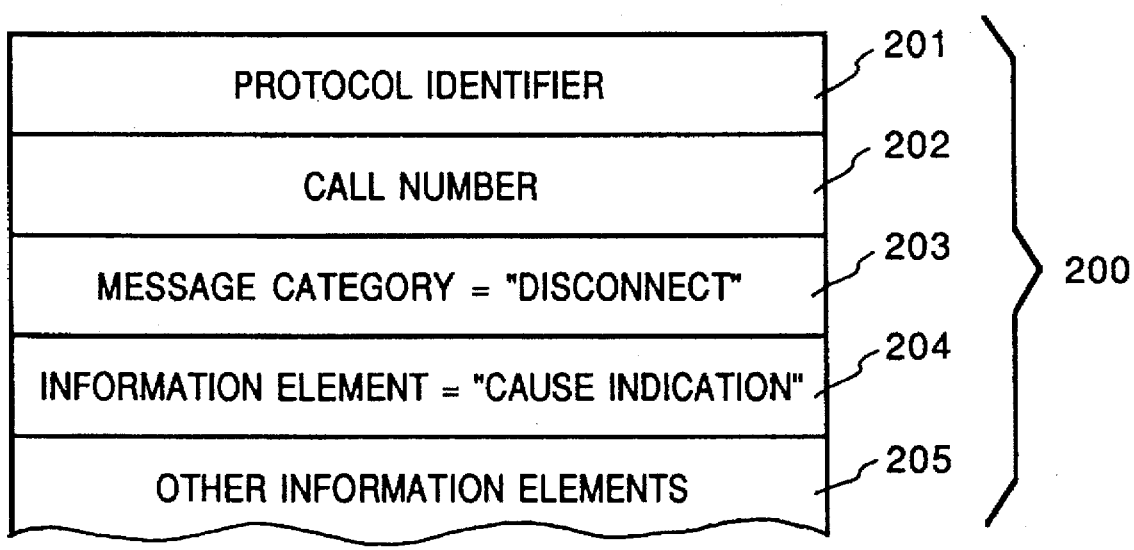
FIG. 2 is a diagram showing an example of the format of a DISCONNECT message in an ISDN.

FIG. 2 is a diagram showing an example of the format of DISCONNECT message 200 in an ISDN.

The message 200 includes a protocol identifier 201 indicating the protocol on the basis of which communication has been performed, a call number 202 used in order to identify registration, cancellation or request of a call or facility, and a message category 203 for identifying the function of a message, such as disconnection, call issuance, answer, answer confirmation, release, etc. In FIG. 2, the message category 203 indicates DISCONNECT. The message 200 further includes an information element 204, in which a cause in conformity with the message category 203 is stored. In the case of FIG. 2, the cause of the DISCONNECT in message category 203 is indicated. Also included is an information element 205, such as a facility, progress indicator, user-user information, tariff notification, etc.

Figure 3:
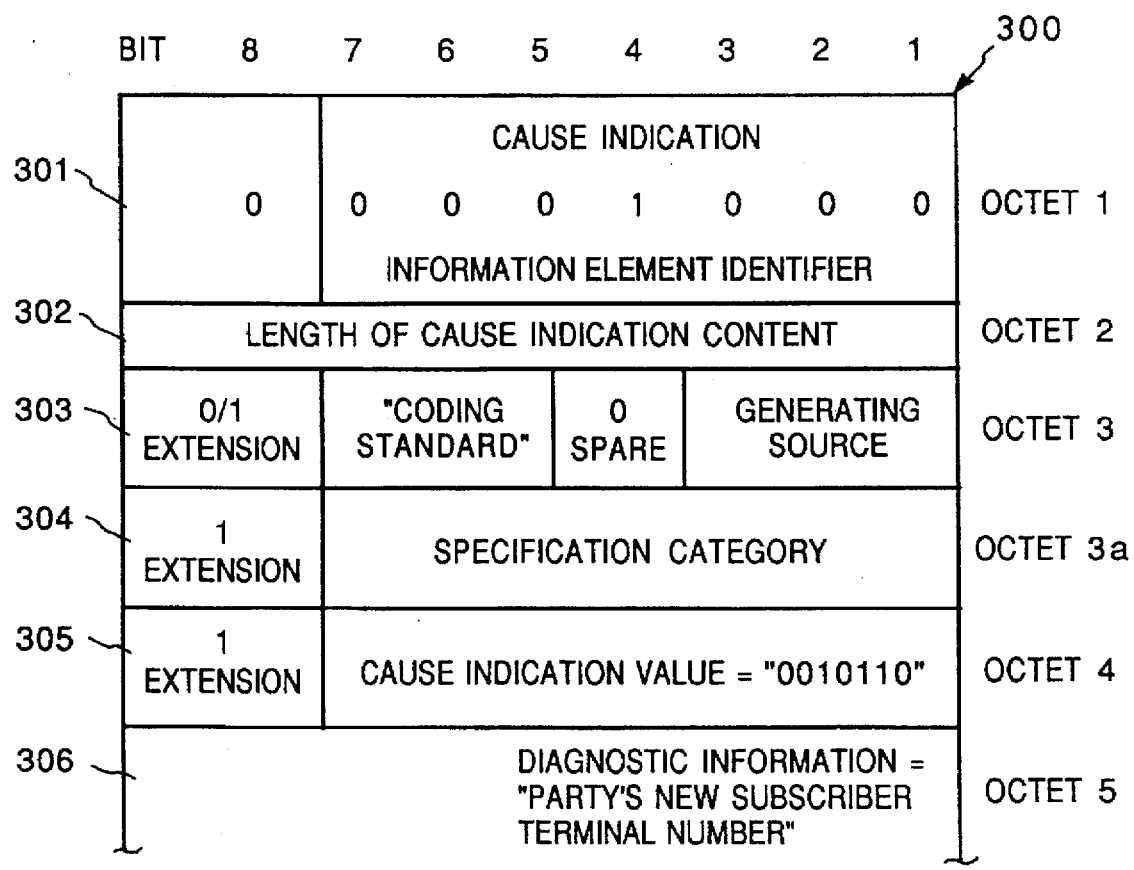
FIG. 3 is a diagram showing the format of a cause-display information element in the DISCONNECT message.

FIG. 3 is a diagram showing an example of the format of an information element 300 illustrating in detail the content of the information element 204 contained in the DISCONNECT message 200 of FIG. 2.

Numeral 301 denotes an information element identifier indicating that the content of this information element is "cause indication". Numeral 302 denotes cause-indication content length, which indicates the length of this format from a third octet onward. Numeral 303 denotes a coding standard, which indicates the particular standard of the format from the third octet onward, as well as the source generating the cause-indication information element, etc. Numeral 304 denotes a specification identification, which indicates the particular standard of the cause indication of the information element 204. Numeral 305 denotes a cause indication value, in which the cause of the information element 204 is indicated by a coding number. In FIG. 3, a coding number "0010110" corresponding to "party's subscriber terminal-number change" is indicated as the cause indication value 305. Numeral 306 denotes diagnostic information added on in dependence upon the cause indication value 305. In FIG. 3, "party's new subscriber terminal number" is indicated as the diagnostic information 306.

It should be noted that an extended bit of the most significant bit (MSB) in the octets from the third octet onward is information indicating whether there is an octet following this octet. This bit is "0" if there is a following octet and "1" if there is no following octet. The most significant bit of octet 3 in the case of FIG. 3 is "0". As a result, the next octet is octet 3a and not octet 4.

Figure 4:
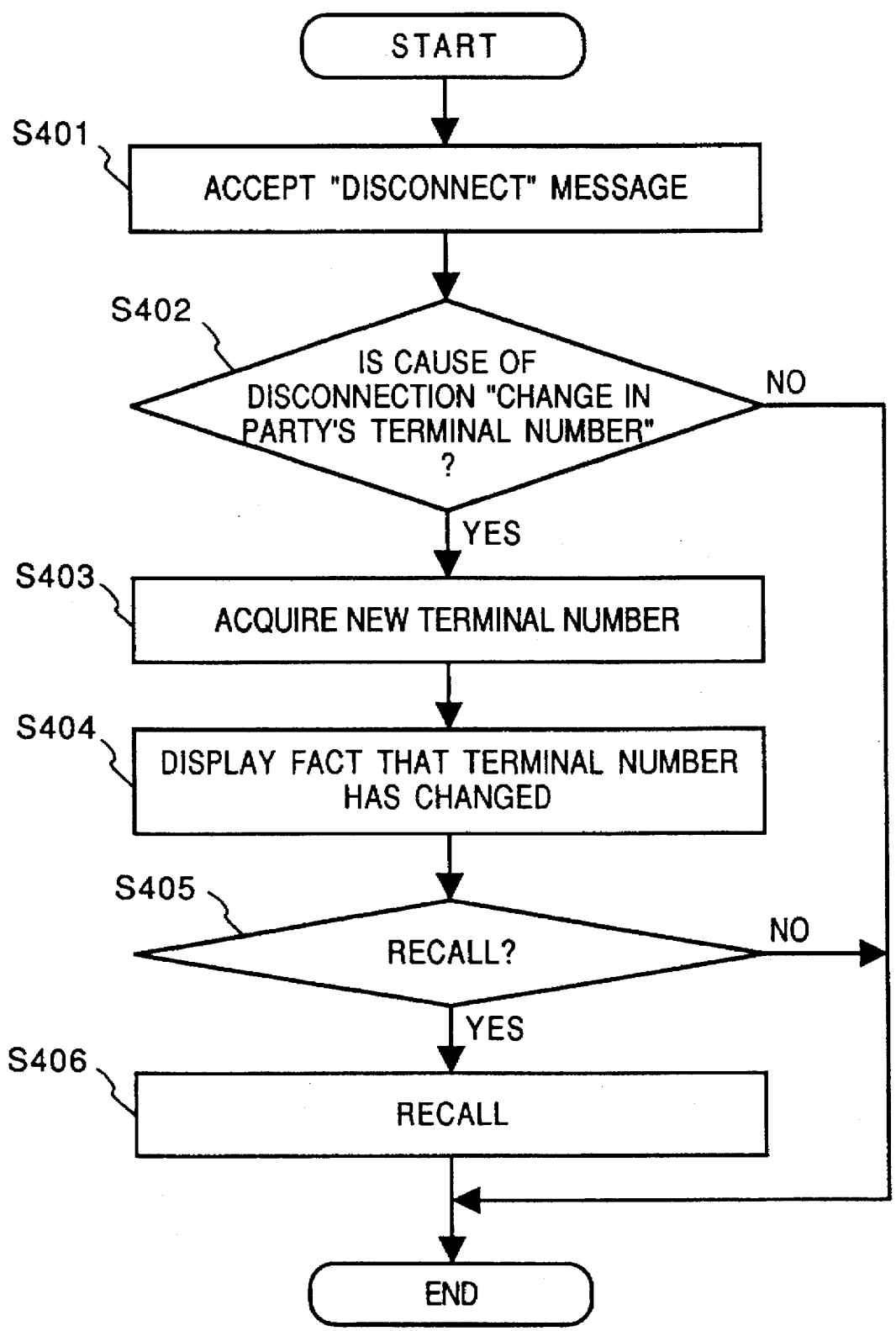
FIG. 4 is a flowchart illustrating an automatic recalling procedure in the embodiment of the invention.

FIG. 4 is a flowchart illustrating an automatic recalling procedure according to this embodiment (the program of this procedure is stored in the ROM within the CPU 12). This procedure is executed by the CPU 12. The flowchart of FIG. 4 illustrates call processing when a connection failure occurs. Processing and the communication procedure at the time of an incoming call are well known and need not be described here.

In a case where an outgoing call to a party fails, the DISCONNECT message 200 is issued from the communication line 16. Accordingly, the CPU 12 accepts the DISCONNECT message 200 via the line controller 15 at step S401. Next, at step S402, the CPU 12 checks the cause indicated in the information element 204 of the DISCONNECT message 200 shown in FIG. 2 and, based upon the cause indication value 305 of the information element 300 shown in FIG. 3, determines whether the cause of the failure of the outgoing call is a change in the party's number. If it is determined that the cause is not a change in the party's number, processing is terminated. If it is determined that the cause is a change in the party's number, then the program proceeds to step S403, at which the CPU accepts the diagnostic information 306 from the information element 300, namely the new number of the party resulting from the change. Next, at step S404, a message to the effect that the party's number has been changed is communicated to the user via the display unit 14. Thereafter, at step S405, whether or not a recall operation is to be performed to call the new number of the party is inquired of the user via the display unit 14. Processing is terminated if a command is received from the user indicating that recalling is not desired. On the other hand, if a command is received from the user indicating that recalling is desired, then the program proceeds to step S406, where a recall operation is performed to call the party's number acquired at step S403.

As a result of this procedure, the party's number following the change is acquired automatically, without requiring entry of this number, and a recall operation can be performed to call the party number acquired.

In the embodiment set forth above, the communication line 16 is described as being an ISDN line. However, this does not place a limitation upon the invention. Any communication line will suffice so long as a new number of a party is communicated from the line when an outgoing call fails because the party's number has changed.

Further, an arrangement may be adopted in which step S404 in FIG. 4 of the foregoing embodiment is deleted so that processing may proceed to the next step promptly without informing the user of the change in the party's number.

Further, an arrangement may be adopted in which, rather than awaiting a response from the user at step S405 in FIG. 4, a display is presented to the effect that the party's number has changed and a recall operation is promptly performed to call the changed party's number.

Thus, in accordance with the first embodiment described above, if the terminal number of the party to communication has changed, the new terminal number of the party after the change is acquired automatically and a recall operation is performed to call the new number of the party. As a result, the labor involved in entering the terminal number of the party after the change can be eliminated, thereby improving operability.

(Second Embodiment)

An apparatus well known in the art stores the telephone numbers of parties frequently communicated with and places an outgoing call to the terminal of a desired party automatically in response to abbreviated dialing. In the second embodiment of the invention, when the telephone number has changed because the party's apparatus has been moved to another location, for example, the old telephone number that has been registered is updated to the new telephone number.

Figure 5:
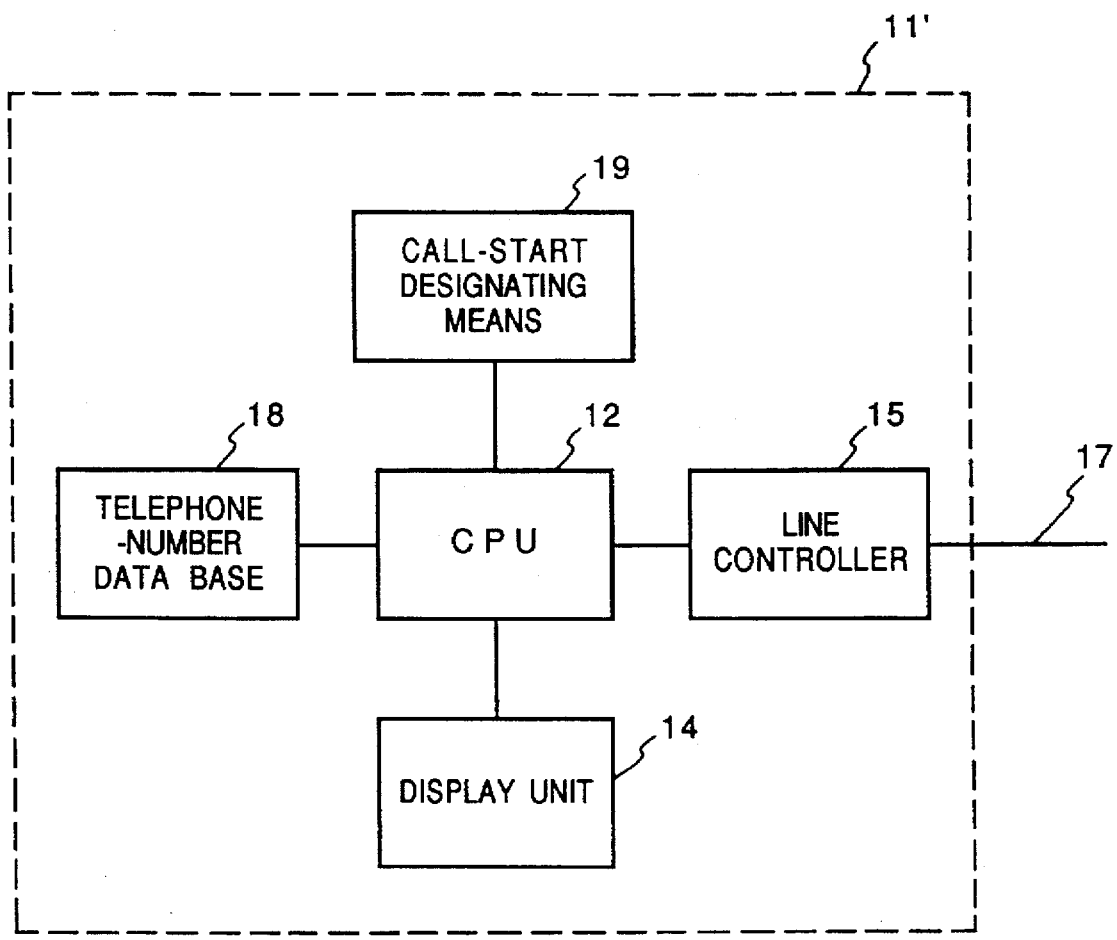
FIG. 5 is a block diagram of a communication terminal apparatus according to the second embodiment.

FIG. 5 is a block diagram illustrating a communication terminal apparatus 11' according to the second embodiment. In this embodiment, the abbreviated dialing number and the telephone number of the party corresponding thereto are stored in a telephone-number data base 18. Further, numeral 19 denotes designating means for designating the start of an outgoing call. The CPU 12, display unit 14 and line controller 15 correspond to those of the first embodiment. These need not be described again. Numeral 17 denotes a communication line.

The telephone-number data base 18 may be a magnetic memory device (such as a hard disk or floppy disk), a NVRAM, etc. If the memory is capable of being freely loaded and unloaded, then the memory can be loaded in another terminal apparatus to make use of the stored abbreviated dial numbers.

Figure 7:
FIG. 7 is a diagram showing an overview of the particulars of data-base updating in the second embodiment.

FIG. 7 illustrates the data stored in the telephone-number data base 18.

As shown in FIG. 7, data is managed in sets, in which each set is composed of an abbreviated number and the terminal number of the party corresponding thereto. Though the data base is constructed of these sets of abbreviated numbers and party telephone numbers, it is of course possible to adopt an arrangement in which the data is managed in sets of single-touch numbers and corresponding party telephone numbers.

The operation of the second embodiment will now be described.

An outgoing call is placed to a party's terminal whose number is the abbreviated number "10" utilizing a data base 70 shown in FIG. 7. If, as a result of the call, the call ends in failure because the number of the party's terminal has changed, the old number, which has already been registered, is updated to the changed telephone number contained in the message received. As a consequence, the data is updated to a data base 71 in FIG. 7 so that whenever a call is henceforth placed to this number, the call will not fail because of the change.

Figure 6:
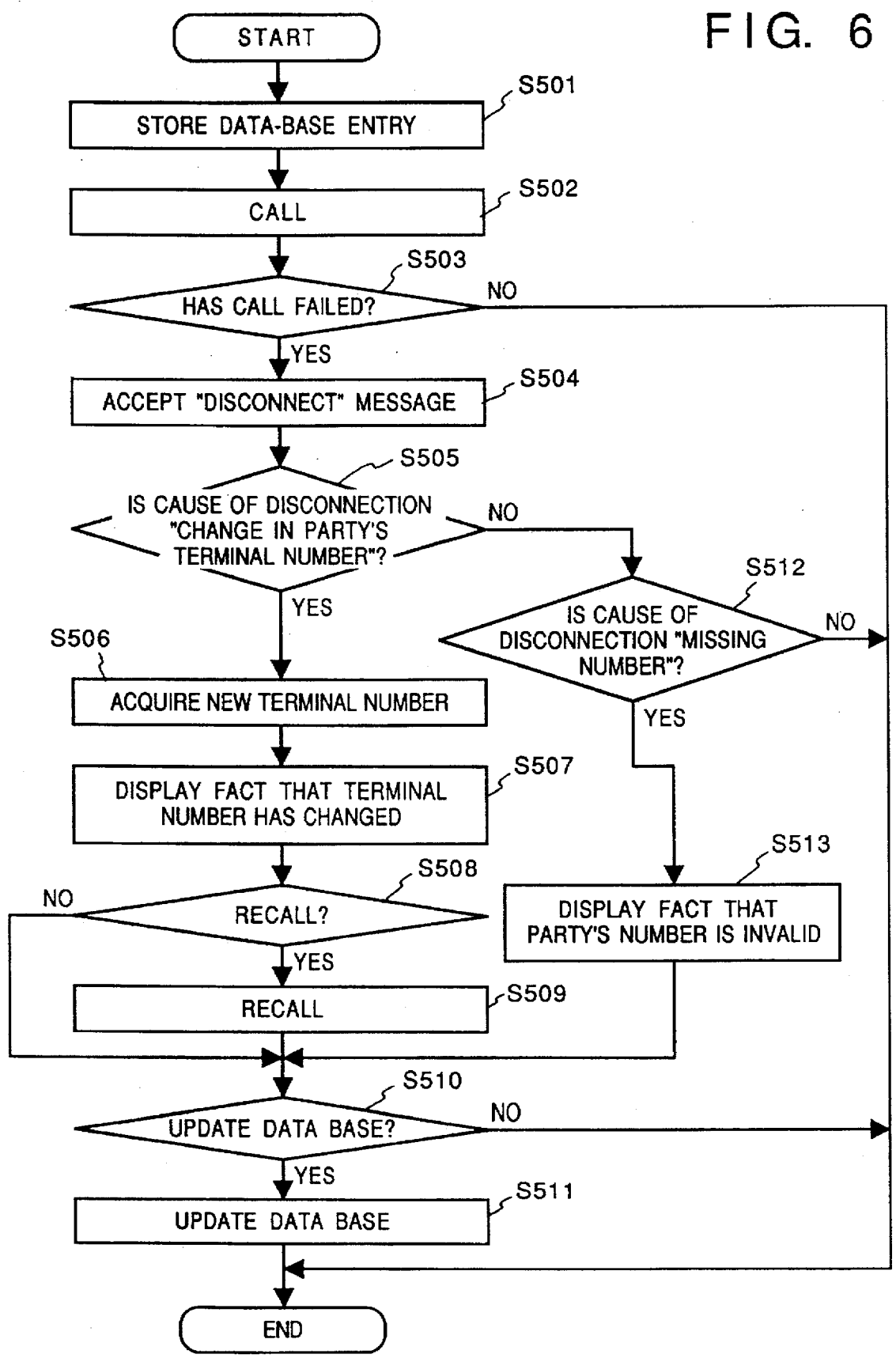
FIG. 6 is a flowchart illustrating a procedure for automatically updating a telephone-number data base in the second embodiment of the invention.

Operation will now be described with reference to the flowchart of FIG. 6. In the second embodiment, the program corresponding to the flowchart of FIG. 6 is stored in the ROM within the CPU 12.

In a case where an outgoing call to a party has been designated by the user through operation of the call-start designating means 19, such as an abbreviated dialing button, single-touch button or directory-call button, the entry of a telephone-number data base relating to this party is stored at step S501 in preparation for subsequent data-base update processing. This is followed by step S502, at which the party's telephone number is acquired from the entry and an outgoing call is placed to the party. Next, at step S503, it is determined whether the call has failed.

If the call has succeeded, processing is terminated.

If the call has failed, the DISCONNECT message 200 is issued from the communication line 17. As a result, the DISCONNECT message 200 is accepted via the line controller 15 at step S504. This is followed by step S505, at which the CPU 12 checks the information element 204 of the DISCONNECT message shown in FIG. 2, namely the information element 300 shown in FIG. 3, and determines, based upon the cause-display value 305, whether the cause of the failure of the call is a change in the party's number. If it is determined that a change in the number is not the cause, then the program proceeds to step S512. If it is determined that a change in the number is the cause, then the program proceeds to step S506, at which the diagnostic information 306 in the information element 300, namely the new number of the party resulting from the change, is acquired. Next, at step S507, the fact that the number has changed is communicated to the user via the display unit 14. This is followed by step S508, at which the user is asked, via the display unit 14, whether or not a recall operation is to be performed to call the new number of the party that has been acquired. If the recall operation has been designated by the user, the program proceeds to step S509, at which the recall operation is carried out to call the new party number that has been acquired. If the designation made by the user is that the recall operation is not desired, then step S509 is skipped and the program proceeds to step S510. Here the user is asked, via a message that appears on the display unit 14, whether the old number, which has been registered in the telephone-number data base 14, is to be updated to the new number of the party. If the user makes a designation to the effect that updating is not desired, then processing is terminated. If the user makes a designation to the effect that updating is desired, the program proceeds to step S511, at which the data of the entry stored at step S501 is updated to the new number of the party acquired at step S506.

If it is determined at step S505 that the cause-display information element 305 of the DISCONNECT message is not "party's terminal-number change", then the program proceeds to step S512, at which the cause-indication information element is checked again to determine whether the cause is a "missing number". If the cause is not a missing number, processing is terminated. If the cause is a missing number, on the other hand, the program proceeds to step S512, at which the fact that the party's number is invalid is displayed on the display unit 14 to so notify the user.

This is followed by step S510, so that steps S510 and S511 are executed. In this case, the operation performed at step S512 is to erase the invalid data that has already been registered.

As a result of the foregoing procedure, the party's number following the change is acquired automatically, without requiring entry of this number, and the data in the telephone-number data base can be updated.

In the second embodiment, an arrangement may be adopted in which step S507 in FIG. 6 is deleted so that processing may proceed to the next step promptly without informing the user of the change in the party's number.

Further, an arrangement may be adopted in which the old data in the telephone-number data base is updated to the changed number of the party promptly without waiting for a response from the user at step S508 in FIG. 6.

Thus, in accordance with the second embodiment described above, if the terminal number of the party to communication has changed, the terminal number of the party after the change is acquired automatically and a recall operation is performed to call this new number of the party, or the data in the telephone-number data base is updated to the party's new number. As a result, the labor involved in entering the terminal number of the party after the change can be eliminated, thereby improving operability.

In the second embodiment, the recall operation is performed after the user indicates whether the data base is to be updated or not. However, this procedure can be reversed. By reversing these steps, the updating registration operation is performed after the called party is verified. This provides a greater sense of security.

As many apparently widely different embodiments of the present invention can be made without departing from the spirit and scope thereof, it is to be understood that the invention is not limited to the specific embodiments thereof except as defined in the appended claims.

What is claimed is:

1. A communication terminal apparatus comprising:
    a data base for storing registered terminal number information;
    calling means for placing an outgoing call to the registered terminal number information stored in said data base;
    receiving means for receiving cause information from a digital network included in a disconnection message for indicating disconnection of the communication terminal apparatus and the digital network in a case where the outgoing call has failed;
    determination means which, when the outgoing call has failed, is for determining a result as to whether the failure of the outgoing call has been caused by a change in the registered terminal number or the registered terminal number being unassigned, based on the cause information;
    informing means for informing a user of the determining result by said determination means;
    automatic updating means for automatically updating after the disconnection, in response to a predetermined manual affirmative instruction by the user, the registered terminal number in said data base, with a new terminal number in a case where said determination means has determined that the failure of the outgoing call has been caused by a change in the registered terminal number; and
    invalidating means for invalidating the registered terminal number in said data base, in a case where said determination means has determined that the failure of the outgoing call has been caused by the registered terminal number being unassigned.

2. The apparatus according to claim 1, further comprising recalling means which, when said determination means has determined that the failure of the outgoing call has been caused by a change in the registered terminal number, is for performing a recall operation in accordance with the new terminal number.

3. The apparatus according to claim 1, wherein said informing means informs of the determining result visually.

4. The apparatus according to claim 1, wherein the communication terminal apparatus is an ISDN terminal apparatus.

5. A communication method performed by a communication terminal apparatus, comprising steps of:

placing an outgoing call to a party in accordance with terminal number information registered in a database;

receiving cause information from the digital network included in a disconnection message for indicating disconnection of the communication terminal apparatus and the digital network in a case where the outgoing call has failed, the communication terminal apparatus having the data base for registering the terminal number information;

determining, a result as to whether the failure of the outgoing call in said placing step has been caused by a change in a called party's terminal number or the called party's terminal number being unassigned by the digital network, on a basis of the disconnection message sent over a line;

informing a user of the determining result in said determining step;

automatically updating the database after the disconnection, in response to a predetermined manual affirmative instruction by a user, to update the called party's terminal number information which has been stored in the database, with a new terminal number which is included in the cause information of said disconnection message in a case where said determination step has determined that the failure of the outgoing call has been caused by the change in the called party's terminal number; and invalidating, in response to the predetermined manual affirmative instruction, the called party's terminal number which has been registered in the database in a case where said determination step has determined that the failure of the outgoing call has been caused by the called party's number being unassigned.

6. A method according to claim 5, further comprising steps of:

recalling by using the new terminal number which is updated by said updating step when said determination step has detected that the failure of the outgoing call in said placing step has been caused by a change in the called party's terminal number.

7. The method according to claim 5, wherein the determining result is informed visually in said informing step.

8. The apparatus according to claim 5, wherein the communication terminal apparatus is an ISDN terminal apparatus.

9. A communication terminal apparatus comprising:

a database for storing terminal number information;

calling means for placing an outgoing call to a party in accordance with the terminal number information stored in said database;

receiving means for receiving a disconnection message from a digital network for indicating disconnection of the communication terminal apparatus and the digital network in a case where the outgoing call has failed;

determination means for determining a result as to whether the failure of the outgoing call has been caused by a change in a called party's terminal number or the called party's terminal number being unassigned on a basis of the disconnection message sent over a line;

informing means for informing a user of the determining result by said determination means;

automatic updating means for automatically updating said database after the disconnection, in response to a predetermined manual affirmative instruction by the user, to update the called party's terminal number, which has been stored in said database, with a new terminal number which is included in the disconnection message when said determination means has determined that the failure of the outgoing call has been caused by a change in the called party's terminal number; and invalidating means for invalidating the called party's terminal number which has been stored in said database, in a case where said determination means determined that the failure of the outgoing call has been caused by the called party's number being unassigned.

10. An apparatus according to claim 9, further comprising recalling means for recalling by using the new terminal number which is updated by said updating means in a case where said determination means determined that the failure of the outgoing call has been caused by a change of the called party's terminal number.

11. The apparatus according to claim 9, wherein said informing means informs of the determining result visually.

12. The apparatus according to claim 9, wherein the communication terminal apparatus is an ISDN terminal apparatus.

13. A method, performed by a communication terminal apparatus which is connected to a network, comprising steps of:

placing an outgoing call according to a terminal number of a destination stored in a memory;

receiving a disconnection message from the network for indicating disconnection of the communication apparatus and the network validating a new terminal number in the memory in accordance with the disconnection message when the new terminal number is included in the disconnection message; and invalidating the terminal number of the destination stored in the memory, in a case where the disconnection message indicates that the terminal number of the destination is unassigned.

14. The method according to claim 13, wherein the new terminal number of the destination is detected in said receiving step when the terminal number of the destination is changed.

15. The method according to claim 13, wherein the indicating is informed visually in said receiving step.

16. The method according to claim 13, wherein the network is an integrated service digital network.

17. A communication terminal apparatus which is connected to a network, comprising:

memory means for storing a terminal number for a destination for an outgoing call;

receiving means for receiving a disconnection message for indicating disconnection of the communication terminal apparatus and the network;

validating means for validating a new terminal number in said memory means in accordance with the disconnection message when the new terminal number is included in the disconnection message; and invalidating means for invalidating the terminal number of the destination stored in said memory means, in a case where the disconnection message indicates that the terminal number of the destination is unassigned.

18. The apparatus according to claim 17, wherein the new terminal number of the destination is detected in said receiving means when the terminal number of the destination is changed.

19. The apparatus according to claim 17, wherein the indicating is informed visually by said receiving means.

20. The apparatus according to claim 17, wherein the network is an ISDN.

21. A communication terminal apparatus connected to a network, comprising:

memory means for storing a terminal number of a destination for an outgoing call;

receiving means for receiving a disconnection message from the network for indicating that a connection between the communication terminal apparatus and network has been disconnected and that the terminal number of the destination is unassigned; and invalidating means for invalidating the terminal number of the destination stored in said memory means in accordance with the disconnection message indicating that the terminal number of the destination is unassigned.

22. The apparatus according to claim 21, wherein said invalidating means invalidates the terminal number of the destination in response to a manual affirmation instruction.

23. The apparatus according to claim 21, wherein said receiving means includes means for informing a user of the reception of the disconnection message.

24. The apparatus according to claim 21, wherein said receiving means receives the disconnection message from an ISDN.

25. A method performed by a communication terminal apparatus connected to a network and including a memory for storing a terminal number of a destination for an outgoing call; comprising the steps of:

receiving a disconnection message from the network for indicating that a connection between the communication terminal apparatus and the network has been disconnected and that the terminal number of the destination is unassigned; and invalidating the terminal number of the destination stored in said memory in accordance with the disconnection message indicating that the terminal number of the destination is unassigned.

26. The method according to claim 25, wherein the terminal number of the destination is invalidated in response to a manual affirmation instruction.

27. The method according to claim 25, wherein said receiving step includes a step of informing a user of the reception of the disconnection message.

28. The method according to claim 25, wherein the disconnection message is received from an ISDN.

* * * * *

UNITED STATES PATENT AND TRADEMARK OFFICE
CERTIFICATE OF CORRECTION

PATENT NO. : 5,732,132
DATED : March 24, 1998
INVENTOR(S) : Noboru Hamada

It is certified that error appears in the above-identified patent and that said Letters Patent is hereby corrected as shown below:

Title page, item [30] Foreign Application Priority Data, please add
December 4, 1992 [JP] Japan............4-350835

[56] Foreign Patent Documents, please delete the references listed and add:
0257044 2/1990 Japan...........379/77
0290771 3/1990 Japan.........379/142

Signed and Sealed this

Thirtieth Day of June, 1998

Attest:

BRUCE LEHMAN

Attesting Officer

Commissioner of Patents and Trademarks